United States Patent Office 2,883,366
Patented Apr. 21, 1959

2,883,366

QUATERNARY PHOSPHONIUM COMPOUNDS AS POLYMERIZATION CATALYSTS FOR SILOXANES

Simon W. Kantor and Alfred R. Gilbert, Schenectady, N.Y., assignors to General Electric Company, a corporation of New York No Drawing. Application December 10, 1954
Serial No. 474,596

24 Claims. (Cl. 260—46.5)

This application is a continuation-in-part of our application, S.N. 429,134, now abandoned, filed May 11, 1954, and assigned to the same assignee as the present invention.

The present invention relates to a method for the rearrangement and condensation of relatively low molecular weight organopolysiloxanes to form higher molecular weight organopolysiloxane oils, resins, gels and gums. More particularly, this invention is concerned with a process for rearranging and condensing relatively low molecular weight organopolysiloxanes which process comprises contacting said low molecular weight organopolysiloxanes with a quaternary phosphonium compound selected from the class consisting of quaternary phosphonium hydroxides and quaternary phosphonium alkoxides. This invention is also concerned with a process in which the quaternary phosphonium compounds are decomposed after the rearrangement and condensation to prevent subsequent degradation of the high molecular weight organopolysiloxanes to lower molecular weight states. This invention is also concerned with polymerizable organopolysiloxane solutions comprising (1) organopolysiloxanes in which all of the organic radicals are members selected from the class consisting of alkyl, alkenyl, aryl, aralkyl, alkaryl, and haloaryl radicals, and (2) and from 0.001 to 0.5 percent, by weight, based on the weight of the organopolysiloxane, of a quaternary phosphonium compound selected from the class consisting of quaternary phosphonium hydroxides and quaternary phosphonium alkoxides. This invention is also concerned with an organopolysiloxane polymerization catalyst comprising the product of reaction of an organopolysiloxane and a quaternary phosphonium compound selected from the class consisting of quaternary phosphonium hydroxides and quaternary phosphonium alkoxides.

In the past, low molecular weight organopolysiloxanes such as, for example, cyclic organopolysiloxanes containing two hydrocarbon radicals attached directly to each silicon atom or mixtures of the aforesaid cyclic polysiloxanes and linear organopolysiloxanes such as, for example, hexamethyldisiloxane or higher linear organopolysiloxanes, in which all of the valences of the silicon atoms, other than the valences which make up the siloxane chains are satisfied by hydrocarbon radicals, have been rearranged and condensed using acidic or basic catalysts. In the case of rearrangements using basic catalysts it has usually been necessary to remove as much of the catalyst as possible or neutralize it, since it was known that the presence of the basic catalyst in the organopolysiloxane oil, gum or resin would tend to break the siloxane chains on heating of the organopolysiloxane to relatively high temperatures and cause the product to revert to a lower molecular weight state. For example, organopolysiloxane gums prepared by the catalytic rearrangement of octamethylcyclotetrasiloxane with potassium hydroxide have been known to lose over ninety percent of their weight in fourteen hours at 250° C. when the potassium hydroxide catalyst remains in the gum. Even at room temperature, these gums have been known to revert to low molecular weight polymers in a humid atmosphere. One of the present solutions to this problem of the adverse effect of the alkaline catalyst is to remove or neutralize the catalyst after polymerization, advantageously followed by a washing step to remove water-soluble salts. This procedure has the disadvantage that in the case of liquid polymers, the removal of the catalyst is a tedious process, and in the case of organopolysiloxane gels, gums and resins, removal is almost impossible because of the solid state of the product.

We have found that the problem of removal of the catalyst may be eliminated by using quaternary phosphonium compounds as catalysts in place of the metal hydroxide catalyst heretofore used. These quaternary phosphonium hydroxide catalysts have been found to be suitable for extremely rapid rearrangement and polymerization of relatively low molecular weight organopolysiloxanes at relatively low temperatures. After the rearrangement and polymerization have taken place, the catalyst may be effectively eliminated from the polymer by heating the resulting polymer to a temperature above the temperature at which the catalyst decomposes. The temperatures at which these quaternary phosphonium compounds decompose is well below the temperature at which undesirable effects on the polymer may occur. The catalysts decompose into phosphine oxides and a hydrocarbon. Neither the phosphine oxide nor the hydrocarbon formed has any adverse effect on the polymer so that the polymers formed do not contain any compounds which would tend to cause degradation of the polymer as in the case of polymers containing alkali-metal compounds. Gums prepared by the method of the present invention have been maintained at 250° C. for extended periods of time without any loss of weight after the initial loss due to the removal of the small amount of low molecular weight materials left in the gum after polymerization.

The quaternary phosphonium compounds used in the practice of the present invention may be described as having the formula (1) 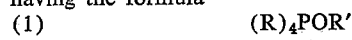

where R represents members selected from the class consisting of alkyl radicals, e.g., methyl, ethyl, propyl, n-butyl, hexyl, octyl, etc., radicals; cycloalkyl radicals, e.g., cyclohexyl, cycloheptyl, etc., radicals; aryl radicals, e.g., phenyl, diphenyl, etc., radicals; alkaryl radicals, e.g., tolyl, xylyl, etc., radicals; aralkyl radicals, e.g., benzyl, phenylethyl, etc., radicals; and mixtures of the aforesaid radicals, and R' is a member selected from the class consisting of hydrogen and alkyl radicals, e.g., methyl, ethyl, propyl, butyl, etc. radicals. Specific compounds within the scope of Formula 1 include, for example, tetramethyl phosphonium hydroxide, tetraethyl phosphonium hydroxide, tetra-n-butyl phosphonium hydroxide, tetraoctyl phosphonium hydroxide, dimethyldiethyl phosphonium hydroxide, phenyltrimethyl phosphonium hydroxide, butyltricyclohexyl phosphonium hydroxide, tetramethyl phosphonium methoxide, tetrabutyl phosphonium butoxide, etc. The quaternary phosphonium compounds of Equation 1 decompose on heating to above about 130° C. according to the following reaction (2) 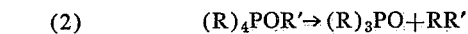

to form phosphine oxides and hydrocarbon. For example, when the rearrangement catalyst is tetra-n-butyl phosphonium hydroxide, the decomposition products are tri-n-butylphosphine oxide and butane, both of which are soluble in the concentrations employed in organopolysiloxanes and inert with regard to their catalytic effect.

The low molecular weight organopolysiloxanes used as starting materials in the present invention may be described as having the average structure (3)     $(R'')_a SiO_{\frac{4-a}{2}}$ where R'' is a member selected from the class consisting of alkyl radicals, e.g., methyl, ethyl, propyl, butyl, octyl, etc. radicals; alkenyl radicals, e.g., vinyl, allyl, etc. radicals; aryl radicals, e.g., phenyl, diphenyl, etc. radicals; alkaryl radicals, e.g., tolyl, xylyl, etc., radicals; aralkyl radicals, e.g., benzyl, phenylethyl, etc., radicals and halogenated aryl radicals, e.g., chlorophenyl, dibromophenyl, etc., radicals; and $a$ has a value from about 1.2 to about 2.5. In addition to the R'' radicals all being the same member, it should be understood that the R'' radical represents mixtures of hydrocarbon radicals. The organopolysiloxanes having the average structure of Formula 3 may be made up of monofunctional, difunctional or trifunctional siloxane units having the structural formulas:

$(R'')_3 SiO_{0.5}$ $(R'')_2 SiO$ $(R'') SiO_{1.5}$ or mixtures of the above siloxane units. It is obvious that when the starting materials contain some monofunctional siloxane units, difunctional and/or trifunctional units must also be present in order for the average structure to fall within Formula 3. For the same reason, when the starting materials containing some trifunctional units, difunctional and/or monofunctional units must also be present. The starting material may be a specific organopolysiloxane, mixtures of specific organopolysiloxanes, or partially condensed organopolysiloxanes as long as the average structure of the starting material falls within the scope of Formula 3. For example, the starting material may be a cyclic organopolysiloxane falling within the scope of Formula 4 below.

(4) 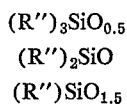

where R'' is as defined above and $n$ is an integer greater than 2, e.g., from 3 to 20 or more. The relatively low molecular weight organopolysiloxane may also be a mixture of cyclic organopolysiloxanes within the scope of Formula 4 with linear compounds having the formula:

(5) 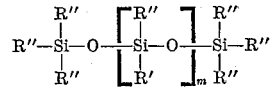

where R'' is as defined above and $m$ is a whole number from 0 to 20 or more. The relatively low molecular weight organopolysiloxane may also be a mixture of cyclic organopolysiloxanes within the scope of Formula 4 with low molecular weight branched-chain organopolysiloxanes such as are disclosed in Patnode Patents 2,469,888 and 2,469,890. Where more than one specific compound is used as the low molecular weight starting material, the organic radicals attached to one of the compounds may be different from those attached to the other compounds. For example, mixtures of octamethylcyclotetrasiloxane and octaethylcyclotetrasiloxane and mixtures of octamethylcyclotetrasiloxane and octaethyltrisiloxane are within the scope of the starting materials of the present invention.

The quaternary phosphonium hydroxides used as rearrangement catalysts in the practice of the present invention may be prepared by forming the Grignard reagent of an alkyl halide or cycloalkyl halide or a mixture of alkyl halides and/or cycloalkyl halides. The Grignard may then be converted to a phosphine by reaction with phosphorus trichloride. The phosphine may then be isolated by fractional distillation and converted to the corresponding phosphonium iodide by reaction with an alkyl iodide. The iodide may be converted to the quaternary phosphonium hydroxide by reacting the iodide with an aqueous solution of silver oxide. The silver iodide which is formed during the course of this reaction precipitates from the solution leaving an aqueous solution of the quaternary phosphonium hydroxide. This solution may be concentrated to about 40 to 60 percent, by weight, of the hydroxide by evaporation of the water. Attempts to concentrate the solution greater than about 60 percent may cause decomposition of the phosphonium compound.

The quaternary phosphonium alkoxides used as rearrangement catalysts in the present invention may be prepared by reacting a quaternary phosphonium chloride with a sodium alcoholate in absolute alcohol. The sodium chloride will precipitate out and the resulting solution may be concentrated to about 40 to 50 percent, by weight, by evaporation of the alcohol.

The quaternary phosphonium hydroxide catalyst may be used as the concentrated aqueous solution just described or may be transferred to a substantially anhydrous organopolysiloxane solution. The transfer of the catalyst to the organopolysiloxane solution may be conducted by removing water from the catalyst under vacuum in the presence of the organopolysiloxane or by adding the concentrated aqueous catalyst solution to a liquid organopolysiloxane solution at elevated temperature such as, for example, 80 to 110° C., while concurrently passing a stream of nitrogen or other inert gas, such as helium, argon, or the like, over or beneath the surface of the siloxane in order to drive out the water. In practice, the catalyst is preferably added to a small amount of cyclic organopolysiloxane such as octamethylcyclotetrasiloxane or octaethylcyclotetrasiloxane, since these two tetramers are readily available. The catalyst may also be added to a small amount of any other organopolysiloxane within the scope of Formula 3, such as, for example, linear or branched-chain chain-stopped organopolysiloxanes including hexamethyldisiloxane, decamethyltetrasiloxane, etc. The use of chain-stopped organopolysiloxane solutions of the quaternary phosphonium compounds is particularly valuable in the preparation of chain-stopped oils since the same solution supplies both the catalyst and the chain stopper for the oil. Thus organopolysiloxane solutions of quaternary phosphonium compounds may be described as the product of reaction of an organopolysiloxane and a quaternary phosphonium hydroxide or alkoxide. Although we do not wish to be bound by theoretical considerations, it is believed that reaction between the organopolysiloxane and the quaternary compound results in short siloxane chains with the quaternary compounds equilibrated as end groups.

According to the process of the present invention, the relatively low molecular weight organopolysiloxane or mixture of organopolysiloxanes having from about 1.2 to about 2.5 organic radicals per silicon atom, is mixed with the quaternary phosphonium compound solution and the rearrangement and polymerization is allowed to proceed until the desired degree of polymerization is obtained. The quaternary phosphonium hydroxide is used either in concentrated aqueous solution or in an organopolysiloxane solution. Where an aqueous solution is used the concentration of the catalyst in the aqueous medium is from about 30 to 60 weight percent based on the weight of the water. Where the organopolysiloxane solution of catalyst is used, the concentration of the quaternary phosphonium hydroxide or alkoxide may vary without limit. Thus, concentrations from 0.1 to 50 or more weight percent of the quaternary phosphonium compound based on the weight of organopolysiloxane solution may be used. Preferably we employ concentrations of from about 1 to 30 percent by weight of the quaternary phosphonium compound in the catalyst solutions.

Where quaternary phosphonium alkoxide catalysts are used, it is preferred to employ the concentrated alcoholic solutions described above, without attempting to convert the alcohol solution to a siloxane solution.

The quaternary phosphonium catalyst solution is added to the organopolysiloxanes in an amount sufficient to obtain a concentration of quaternary phosphonium compound of from about 0.001 percent to 0.5 percent and preferably from about 0.005 percent to about 0.05 percent, by weight, of the total organopolysiloxanes present. The rate of polymerization of the lower molecular weight organopolysiloxanes is dependent to some extent on the concentration of quaternary phosphonium hydroxide but the concentrations mentioned above have been found suitable for catalyzing the reaction at desirable rates.

The temperature of the reaction may vary within wide limits. For example, a solution of low molecular weight organopolysiloxanes may be polymerized by the method of the present invention to a high molecular weight gum at room temperature in about forty-eight hours. However, it is preferable to use polymerization temperatures above room temperature since the rate of polymerization increases with temperature. Since the quaternary phosphonium catalysts decompose at temperatures above about 130° C., it is essential to effect the polymerization at temperatures below this point and desirable, because of rate considerations, to effect the polymerization at temperatures substantially above room temperature but below the decomposition temperature. In practice, temperatures of from about 80 to 130° C. are used for the reaction. Octamethylcyclotetrasiloxane containing about 0.01 percent, by weight, of tetra-n-butyl phosphonium hydroxide (added as the concentrated siloxane solution) has been polymerized to a stiff gum in about fifteen minutes at 110° C. This gum exhibited only a 13.7 percent weight loss after being maintained in an air oven at 250° C. for 21.5 hours. Further heating did not affect the loss of weight of this compound. This 13.7 percent weight loss may be explained by the consideration that in the polymerization of cyclic organopolysiloxanes, an equilibrium is established between the low molecular weight compound and the high polymer. The weight loss at 250° C. represents the volatilization of the low molecular weight components.

We have found that there are three primary factors which control the rate and degree of polymerization occurring in the process of the present invention. First, there is the concentration of catalyst. As discussed above, the rate increases with the concentration of catalyst and the effective ranges are given. The second factor is the temperature at which the reaction is effected. This effect has been discussed above. Thirdly, there is the consideration of the amount of water in the reaction system. We have found that the degree of polymerization obtainable in any system varies inversely with the amount of moisture in the system, the more moisture being present, the lower the degree of polymerization. Accordingly, we have found it desirable to effect our reaction under a stream of nitrogen or other inert gas, e.g., helium, argon, etc., which will remove any moisture formed during the reaction. This is particularly desirable in the case where the quaternary phosphonium hydroxide is used as a concentrated aqueous solution. However, it is to be understood that the reaction proceeds even though the water is not removed from the system.

After the rearrangement and polymerization of the present invention has been effected, the high molecular weight compound still contains the catalyst in its original form or in the form of a silanolate salt. The quaternary phosphonium catalyst may then be decomposed by heating the product to a temperature above the decomposition temperature of the catalyst, or if subsequent high temperature processing of the high molecular weight organopolysiloxane is contemplated, the step of heating to decompose the catalyst may be eliminated. In this case the catalyst will be decomposed during the subsequent processing of the product. The temperature at which the many catalysts within the scope of Formula 1 are decomposed varies to some extent. However, most of the catalysts are decomposed at temperatures slightly above 130° C. In order to insure that all of the catalyst is decomposed, we prefer to heat the polymerized product briefly at a temperature of 150 to 250° C. to insure complete decomposition. The time of heating for purposes of decomposition is not critical since the catalysts decompose readily as soon as they reach their decomposition temperatures. However, for convenience we prefer to heat the catalyst for several minutes above its decomposition temperature to insure that all of the catalyst reaches this temperature and decomposes.

The following examples are illustrative of the practice of our invention and are not intended for purposes of limitation.

Examples 1 to 4 show the preparation of a typical quaternary phosphonium hydroxide and the preparation of typical catalyst solutions.

Example 1

The Grignard reagent of 1-bromobutane was prepared by the dropwise addition of 2000 grams of the aforementioned compound in 4000 ml. of anhydrous ether to 355 grams magnesium turnings in 1000 ml. ether and refluxing the mixture. The Grignard reagent was then cooled in an ice bath while a solution of 669 grams phosphorus trichloride in ether was added dropwise, and the mixture was then refluxed for 2 hours to form tri-n-butyl phosphine. The tri-n-butyl phosphine was recovered by adding an aqueous solution of ammonium chloride to the reaction mixture, separating the ether layer which had formed, evaporating the ether from this layer to give a phosphine solution, and distilling the solution to recover the phosphine. The phosphine was converted to tetra-n-butyl phosphonium iodide by dissolving 40.4 grams (0.2 mole) of the phosphine in 50 ml. of absolute ethanol and adding an alcoholic solution containing 73.6 grams (0.4 mole) of n-butyl iodide and evaporating the solvent. Tetra-n-butyl phosponium hydroxide was then formed by adding 46.4 grams (0.2 mole) of silver oxide in 250 ml. of water to 76.5 grams (0.2 mole) of the iodide. The resulting silver iodide was filtered from the solution and the filtrate was found to contain 153 mg. of tetra-n-butyl phosponium hydroxide per ml. of solution (15.3%, by weight). Various portions of this 15.3% aqueous tetra-n-butyl phosphonium hydroxide solution were concentrated by boiling off the water under a nitrogen stream to give concentrated solutions containing from 40 to 60 percent of the catalyst by weight. Attempts to obtain higher concentrations resulted in decomposition of the catalyst.

Example 2

A siloxane solution of tetra-n-butyl phosphonium hydroxide was prepared by concentrating a 15.3% aqueous solution of the hydroxide to a 48.7% solution by the method of Example 1. One ml. of the resulting aqueous solution was added to 25 ml. of octamethylcyclotetrasiloxane and subjected to a vacuum of about 0.1 mm. for two hours. This resulted in a basic, clear, low viscosity siloxane solution which was found to contain 3.36%, by weight, of the hydroxide.

Example 3

A 19 ml. sample of 15.3% tetra-n-butyl phosphonium hydroxide from Example 1 was concentrated to 7 ml. by boiling off the water under a nitrogen stream. This concentrated aqueous catalyst was added to 100 ml. of octamethylcyclotetrasiloxane which was maintained at 82° C. and which had a stream of nitrogen passing through the liquid. After about twenty minutes there was obtained a clear, low viscosity silicone oil which was found to contain 2.23%, by weight, of tetra-n-butyl phosphonium hydroxide.

Example 4

Another siloxane solution of catalyst was prepared by evaporating the 15.3% aqueous solution of Example 1 to a concentration of 48.7% catalyst and adding 1 ml. of the resulting solution to 25 ml. of octaethylcyclotetrasiloxane and subjecting the mixture to vacuum for about two hours. This resulted in a clear, fluid diethylsiloxane oil which was found to contain 1.9%, by weight, of tetra-n-butyl phosphonium hydroxide.

The following examples show the preparation of gums by the method of the present invention using quaternary phosphonium catalysts similar to those prepared in the previous examples.

Example 5

A mixture of 15 ml. of octamethylcyclotetrasiloxane and 5 ml. of 40 percent aqueous tetra-n-butyl phosphonium hydroxide was mixed and stirred under a vacuum for one hour to give a solution containing 224 mg. of the quaternary phosphonium compound per ml. of solution. Then 0.1 ml. (22.4 mg. of tetra-n-butyl phosphonium hydroxide) of this solution was added to 100 ml. of octamethylcyclotetrasiloxane which had been heated to 110° C. The solution was maintained at this temperature for 1½ minutes until a high viscosity organopolysiloxane gum having a viscosity greater than $32 \times 10^6$ centipoises was formed. This gum was then heated at 150° C. for about 1 hour to decompose the catalyst.

Example 6

Following the procedure of Example 5 a solution containing 115 mg. of tetra-n-butyl phosphonium hydroxide per ml. of solution was formed from a mixture of 27.5 grams of octamethylcyclotetrasiloxane and 5.0 ml. of 40 percent aqueous tetra-n-butyl phosponium hydroxide. A gum made from this catalyst solution had a viscosity greater than $10 \times 10^6$ centipoises.

Example 7

Following the procedure of Example 5 a catalyst solution containing 44.5 mg. of tetra-n-butyl phosphonium hydroxide per ml. of solution was formed from a mixture of 2 ml. of 44 percent aqueous tetra-n-butyl phosphonium hydroxide and 25 ml. of decamethyltetrasiloxane. A total of 0.2 ml. (9 mg. of tetra-n-butyl phosphonium hydroxide) was added to 100 ml. of octamethylcyclotetrasiloxane which had been heated at 107 to 110° C. In fifteen minutes a gum having a room temperature viscosity of $1.73 \times 10^6$ centipoises had been formed.

Example 8

A gum was prepared by adding 0.4 ml. of the siloxane solution of tetra-n-butyl phosphonium hydroxide prepared in Example 2 (13.4 mg. of the catalyst) to 100 ml. of octamethylcyclotetrasiloxane which had been previously dried in vacuum. A 15 ml. portion of this solution was placed in a stoppered, dry test tube and placed in a 110° C. bath. At the end of ten minutes a gum having a viscosity greater than $10 \times 10^6$ centipoises was formed. This gum was then heated at 150° C. for several minutes to decompose the catalyst into tri-n-butyl phosphine oxide and butane.

Example 9

The procedure of Example 8 was followed except that the octamethylcyclotetrasiloxane was stirred and maintained under a nitrogen atmosphere during the reaction. After two to three minutes a very stiff gum which was completely soluble in toluene was formed which had a viscosity greater than $25 \times 10^6$ centipoises.

Example 10

One hundred ten ml. of octamethylcyclotetrasiloxane containing a small amount of moisture was placed in a large test tube and warmed to 110° C. with stirring while a slow stream of dry nitrogen was passed over the surface in order to drive out the moisture. Subsequently 0.4 ml. of the siloxane solution of catalyst prepared in Example 2 (13.4 mg. of tetra-n-butyl phosphonium hydroxide) was added to the stirred polysiloxane while maintaining the nitrogen atmosphere. After three minutes the polymerization was stopped and the gum was cooled by placing the flask in ice water. The resulting dimethyl silicone gum had a viscosity of $9.3 \times 10^6$ centipoises. A second sample of gum was prepared as above except that polymerization was allowed to take place for fifteen minutes. This resulted in a gum having a viscosity of $29 \times 10^6$ centipoises. The following table shows the percentage weight loss of these two gums on being heated in air at 250° C.

| Heating time (Hours) | Percent Weight loss 3 minute polymerization | Percent Weight loss 15 minute polymerization |
| --- | --- | --- |
| 0 | 0 | 0 |
| 0.5 | 18.0 | 7.45 |
| 1.5 | 21.7 | 10.2 |
| 3.5 | 22.5 | 11.9 |
| 5.25 | 22.9 | |
| 5.5 | | 12.4 |
| 20.75 | 24.9 | |
| 21.5 | | 13.7 |

Example 11

A gum was prepared by adding 0.8 ml. of the octaethylcyclotetrasiloxane solution of tetra-n-butyl phosphonium hydroxide prepared in Example 4 (15.2 mg. of tetra-n-butyl phosphonium hydroxide) to 100 ml. of octamethylcyclotetrasiloxane which was maintained at 110° C. under a nitrogen atmosphere. In two minutes a gum was formed having a viscosity greater than $10 \times 10^6$ centpoises.

Example 12

A 15.3% aqueous solution of tetra-n-butyl phosphonium hydroxide was concentrated by the method of Example 1 to a concentration of 30.0%. Approximately 100 ml. of octamethylcyclotetrasiloxane was heated to 110° C. and stirred in a nitrogen atmosphere while 0.03 ml. of this 30% catalyst (9 mg. of tetra-n-butyl phosphonium hydroxide) was added. Within fifteen minutes a high molecular weight polymer was formed. This gum was heated an additional forty-five minutes in air and allowed to cool to room temperature. The gum was found to have a viscosity of $10.6 \times 10^6$ centipoises.

Example 13

A gum may be prepared by the method of Example 9 using 1,2,3,4-tetramethyl-1,2,3,4-tetraphenylcyclotetrasiloxane in place of the octamethylcyclotetrasiloxane to form an organopolysiloxane gum made up of methylphenylsiloxane units.

Example 14

A gum may be prepared by the method of Example 9 using 50 ml. of octamethylcyclotetrasiloxane and 50 ml. of octaphenylcyclotetrasiloxane in place of the octamethylcyclotetrasiloxane of Example 6 to form an organopolysiloxane gum containing both diphenylsiloxane and dimethylsiloxane units.

Example 15

This example describes the preparation of gums containing both dimethyl siloxane units and diphenyl siloxane units, using an octamethylcyclotetrasiloxane solution of catalyst containing 60 mg. of tetra-n-butyl phosphonium hydroxide per ml. of solution. Enough of this catalyst solution was added to a mixture of 1 part, by weight, of octaphenylcyclotetrasiloxane and 9 parts, by weight, of octamethylcyclotetrasiloxane to give 0.02 weight percent of tetra-n-butyl phosphonium hydroxide. After heating this mixture at 123° C. for ten minutes a gum was formed having a viscosity in excess of $1 \times 10^6$ centipoises. Following this same procedure a gum having a similar viscosity was formed by heating a mixture of 2 parts by weight of octaphenylcyclotetrasiloxane and 8 parts by weight of octamethylcyclotetrasiloxane with 0.03 percent, by weight, of tetra-n-butyl phosphonium hydroxide at 128° C. for 10 minutes.

*Example 16*

This example describes the preparation of organopolysiloxane gums containing both methylvinylsiloxane units and dimethylsiloxane units. These gums were formed by polymerizing mixtures of octamethylcyclotetrasiloxane and 1,3,5,7 - tetramethyl - 1,3,5,7 - tetravinylcyclotetrasiloxane containing 1, 2, and 3 percent, by weight, of the latter compound. In each case the catalyst used was a solution of tetra-n-butyl phosphonium hydroxide in octamethylcyclotetrasiloxane in which the concentration of the quaternary compound was 70 mg. per ml. of solution. Sufficient catalyst solution was added to each of the vinyl-containing organopolysiloxane solutions after the solutions had been heated to 110° C. to give 0.03 percent, by weight, of tetra-n-butyl phosphonium hydroxide. The solutions were maintained at this temperature for 10 minutes to form gums having viscosities in excess of $20 \times 10^6$ centipoises. Each of these gums was subsequently heated for one hour at 150° C. to decompose the catalyst. Each of the resulting gums was a clear, colorless, toluene soluble, noncross-linked product.

*Example 17* n-Butyl tricyclohexyl phosphonium hydroxide was prepared by the method of Example 1 by forming the Grignard reagent of cyclohexyl chloride and reacting this Grignard reagent with phosphorous trichloride to form the tricyclohexyl phosphine. The phosphine was then reacted with n-butyl iodide to form n-butyl tricyclohexyl phosphonium iodide. The phosphonium hydroxide was then formed by reacting the iodide with an aqueous solution of silver oxide and removing the silver iodide precipitate. This aqueous solution was concentrated by evaporation of water under heat and nitrogen to a strength of about 70%, by weight, n-butyl tricyclohexyl phosphonium hydroxide. About 0.06 ml. of the aqueous solution was added to 100 ml. of octamethylcyclotetrasiloxane which had been heated to 110° C. and maintained in a nitrogen stream. After sixty-eight minutes a gum having a viscosity of $3.2 \times 10^6$ centipoises was formed. A sample of this gum lost 15.3% weight after 22.5 hours at 250° C.

*Example 18*

Tetraethyl phosphonium hydroxide was prepared according to the method of Example 1 by reacting the Grignard reagent of ethyl bromide with phosphorous tribromide to form triethyl phosphine. The phosphine was converted to the tetraethyl phosphonium iodide by treatment with ethyl iodide. The iodide was then converted to the phosphonium hydroxide by treatment with silver oxide. This aqueous solution was concentrated to about 30%, by weight, of tetraethyl phosphonium hydroxide, and 0.1 ml. of this solution was added to 100 ml. of octamethylcyclotetrasiloxane which had been heated to about 110° C. and maintained under a nitrogen atmosphere. The mixture was stirred during the entire reaction and after about fifteen minutes the viscosity of the product leveled off. After one hour, heating and stirring was stopped and the polymer was cooled to room temperature. The viscosity of the product was 740,000 centipoises. The catalyst was decomposed after polymerization by heating the product for several minutes at about 150° C. The weight loss of a sample of this polymer was 11.3% after twenty-one hours at 250° C.

*Example 19*

Tetramethyl phosphonium hydroxide was prepared by the method of Example 1 using the Grignard reagent of methyl bromide, phosphorous tribromide, methyl iodide, and silver oxide. This aqueous solution (10.3% by weight) was concentrated to about 20%, by weight, of the phosphonium hydroxide and 0.2 ml. of the resulting catalyst was added to 100 ml. of octamethylcyclotetrasiloxane which had been heated to 110° C. After about sixty minutes an oil had been formed which had a viscosity of 130,000 centipoises.

*Example 20*

One ml. of the aqueous tetramethyl phosphonium hydroxide of Example 19 was added to 25 ml. of octamethylcyclotetrasiloxane according to the method of Example 2. This resulted in a solution of low molecular weight organopolysiloxane oil containing about 0.39% catalyst, by weight. One ml. of this catalyst solution was added to 100 ml. of octamethylcyclotetrasiloxane which had been heated to a temperature of 110° C. and maintained under an atmosphere of nitrogen. After thirty minutes a gum was formed which had a viscosity of $1.04 \times 10^6$ centipoises.

*Example 21*

Tetra-n-butyl phosphonium butoxide may be formed by reacting tetra-n-butyl phosphonium chloride, prepared from tri-n-butyl phosphine and n-butyl chloride by the method of Example 1 with sodium butoxide in n-butanol. The sodium chloride formed will precipitate from the n-butanol solution and the solution may be concentrated to about 40%, by weight, of tetra-n-butyl phosphonium butoxide. About 0.1 ml. of the resulting concentrated alcoholic solution of catalyst may be added to 100 ml. of octamethylcyclotetrasiloxane which has been heated to 110° C. and which has been stirred in an atmosphere of nitrogen. After about fifteen minutes a gum will be formed having a viscosity in excess of $1 \times 10^6$ centipoises. This gum may then be heated at about 150° C. for several minutes to decompose the catalyst into tri-n-butyl phosphine oxide and n-octane.

*Example 22*

An organopolysiloxane potting gel may be formed by the method of Example 9 by substituting a liquid organopolysiloxane containing about 1.99 organic radicals per silicon atom for the octamethylcyclotetrasiloxane of Example 9. This oil may be prepared by hydrolyzing a mixture of methyltrichlorosilane and dimethyldichlorosilane containing 99 mol percent dimethyldichlorosilane and removing the water from the resulting oil. This oil may be polymerized in the place in which it is to be used to form a stiff gel which shows little shrinkage on polymerization.

*Example 23*

An oil having a ratio of methyl radicals to silicon atoms of 2.02 was prepared by adding 2 ml. of a solution of tetra-n-butyl phosphonium hydroxide (87 mg.) to a mixture of 24.9 grams of decamethyltetrasiloxane and 581.4 grams of octamethylcyclotetrasiloxane which was maintained at 110° C. with stirring under an atmosphere of nitrogen. After about 60 minutes an oil was formed having a viscosity of about 50 centipoises at 110° C. The catalyst was decomposed by heating this oil at 150° C. for fifteen minutes. The resulting oil had a viscosity of 158 centistokes at 38° C. and 58 centistokes at 99° C.

*Example 24*

An organopolysiloxane resin may be formed by the method of Example 9 by substituting for the octamethylcyclotetrasiloxane a relatively low molecular weight organopolysiloxane containing about 1.7 organic radicals per silicon atom in a toluene solution. This toluene solution may be formed by hydrolyzing a mixture containing about 8%, by weight, of methyltrichlorosilane, 23%, by weight, phenyltrichlorosilane, 28%, by weight, dimethyldichlorosilane and 41%, by weight, diphenyldichlorosilane and transferring the cohydrolysis product to toluene. After polymerization for about ten minutes at about 120° C. and removal of the toluene, the resulting resin will be a rigid, infusible solid.

*Example 25*

This example shows the preparation of a rubber from a gum prepared by the method of the present invention and the comparison of the high temperature properties of this rubber with a rubber prepared from a metal hydroxide catalyzed gum. Eight hundred ml. of octamethylcyclotetrasiloxane was heated to 118° C. with stirring in a nitrogen atmosphere. To this compound was added 9 ml. of a siloxane solution of tetra-n-butyl phosphonium hydroxide containing 0.010 gram of the latter compound per ml. of solution. This catalyst solution was prepared by the method of Example 2. After seven minutes a gum having a viscosity of $20 \times 10^6$ centipoises at room temperature had been formed. One hundred parts of this gum were compounded with 40 parts, by weight, of silica aerogel and 1.65 parts, by weight, of benzoyl peroxide on rubber milling rolls, and samples of the compounded product were press cured at 120° C. for twenty minutes. A second series of rubber samples were prepared by compounding and press curing a potassium hydroxide catalyzed gum by the same method. The potassium hydroxide gum was prepared by adding 0.02%, by weight, of potassium hydroxide to octamethylcyclotetrasiloxane which had been heated to 150° C. in a nitrogen atmosphere. After four hours a gum having a viscosity in excess of $1 \times 10^6$ centipoises was formed. Samples of the rubber prepared from the tetra-n-phosphonium hydroxide gum [$(C_4H_5)_4POH$ rubber] and samples of rubber prepared from the potassium hydroxide gum [KOH rubber] were heated in an air oven for twenty-one hours at 150° C., then for 131 hours at 250° C., and then for forty-eight hours at 300° C. As shown by the table below, the properties of the two rubbers are comparable after the heating at 250° C. Heating of the $(C_4H_9)_4POH$ rubber at 300° C. has a minor effect on its physical properties while the same temperature destroys the elastic characteristics of the KOH rubber.

| | | 131 Hrs. @ 250° C. | 24 Hrs. @ 300° C. | 48 Hrs. @ 300° C. |
|---|---|---|---|---|
| $(C_4H_9)_4POH$ Rubber | Tensile (p.s.i.) | 725 | 605 | 637 |
| | Elongation (percent). | 250 | 175 | 125 |
| KOH Rubber | Tensile (p.s.i.) | 753 | No longer rubber; surface completely oxidized; hard and brittle. | |
| | Elongation (percent. | 250 | | |

The organopolysiloxanes prepared by the method of the present invention have the same utility as those prepared by conventional methods and in addition have the property of being unusually stable at elevated temperatures. The gums of the present invention may be compounded into cured rubbers in the usual manner by blending with a filler such as silica aerogel and a cross linking agent such as benzoyl peroxide and curing at elevated temperatures. Rubbers formed from the gums of the present invention show good heat stability at temperatures as high as 300° C. These rubbers are useful as insulation for wire which is to be used in high temperature applications and are useful as gaskets. The oils prepared by the method of the present invention are valuable as hydraulic fluids and as lubricant additives. The resins prepared by the method of the present invention may be advantageously employed as coating and insulating compositions.

What we claim as new and desire to secure by Letters Patent of the United States is:

1. The method of increasing the molecular weight of an organopolysiloxane which comprises the steps of (1) contacting an organopolysiloxane represented by the average structural formula $$(R'')_a SiO_{\frac{4-a}{2}}$$

where R'' represents members selected from the class consisting of alkyl, alkenyl, aryl, alkaryl, aralkyl and haloaryl radicals, and $a$ has a value between 1.2 and 2.5, with a catalytic amount of a quaternary phosphonium compound represented by the formula $$(R)_4POR'$$

where R represents members selected from the class consisting of alkyl, cycloalkyl, aryl, aralkyl, and alkaryl radicals and the mixtures of the aforesaid members and R' is a member selected from the class consisting of hydrogen and alkyl radicals, at a temperature below that at which decomposition of the quaternary phosphonium compound would occur until an increase in molecular weight is effected and (2) heating the resulting product at a temperature above which decomposition of the quaternary phosphonium compound occurs until the decomposition is completed.

2. The process of increasing the molecular weight of an organopolysiloxane which comprises contacting an organopolysiloxane having the average formula $$(R'')_a SiO_{\frac{4-a}{2}}$$

where R'' represents members selected from the class consisting of alkyl, alkenyl, aryl, alkaryl, aralkyl and haloaryl radicals and $a$ has a value between 1.2 and 2.5, with a catalytic amount of a quaternary phosphonium compound selected from the class consisting of quaternary phosphonium hydroxides and quaternary phosphonium alkoxides at a temperature below that at which decomposition of the quaternary phosphonium compound would occur until an increase in molecular weight is effected.

3. The process of increasing the molecular weight of organopolysiloxanes which comprises contacting an organopolysiloxane having the average formula $$(R'')_a SiO_{\frac{4-a}{2}}$$

where R'' represents members selected from the class consisting of alkyl, alkenyl, aryl, alkaryl, aralkyl and haloaryl radicals, and $a$ has a value between between 1.2 and 2.5, with from 0.001% to 0.5%, by weight, of a quaternary phosphonium compound represented by the formula $$(R)_4POR'$$

where R represents members selected from the class consisting of alkyl, cycloalkyl, aryl, aralkyl and alkaryl radicals and mixtures of the aforesaid members and R' is a member selected from the class consisting of hydrogen and alkyl radicals, at a temperature below that at which decomposition of the quaternary phosphonium compound would occur and while maintaining the reactants under a stream of inert gas until an increase in molecular weight is effected.

4. The process of polymerizing octamethylcyclotetrasiloxane which process comprises contacting octamethylcyclotetrasiloxane with about 0.001% to 0.5%, by weight, of a quaternary phosphonium compound represented by the formula $$(R)_4POR'$$

where R represents members selected from the class consisting of alkyl, cycloalkyl, aryl, aralkyl, and alkaryl radicals and the mixtures of the aforesaid members, and R' is a member selected from the class consisting of hydrogen and alkyl radicals, at a temperature between about room temperature and 130° C. until an increase in molecular weight is effected.

5. The process of claim 4 in which the quaternary phosphonium compound is tetra-n-butyl phosphonium hydroxide.

6. The process of claim 4 in which the quaternary phosphonium compound is n-butyl tricyclohexyl phosphonium hydroxide.

7. The process of claim 4 in which the quaternary phosphonium compound is tetraethyl phosphonium hydroxide.

8. The process of claim 4 in which the quaternary phosphonium compound is tetramethyl phosphonium hydroxide.

9. The process of claim 4 in which the quaternary phosphonium compound is tetra-n-butyl phosphonium butoxide.

10. The process of forming a high molecular weight organopolysiloxane gum which comprises contacting a first portion of octamethylcyclotetrasiloxane with the product of reaction of a second portion of octamethylcyclotetrasiloxane and tetra-n-butyl phosphonium hydroxide, said hydroxide being present in an amount equal to from 0.001% to 0.5%, by weight, based on the total weight of said first portion and said second portion of octamethylcyclotetrasiloxane.

11. The process of increasing the molecular weight of a first organopolysiloxane having the average formula

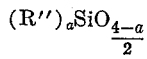

which process comprises contacting said first organopolysiloxane with the product of reaction of a second organopolysiloxane having the average formula

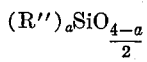

and a quaternary phosphonium compound selected from the class consisting of quaternary phosphonium hydroxides and quaternary phosphonium alkoxides, where R'' represents members selected from the class consisting of alkyl, alkenyl, aryl, alkaryl, aralkyl, and haloaryl radicals, and has a value between 1.2 and 2.5, said quaternary phosphonium compound being present in a catalytic amount with respect to the total amount of said first organopolysiloxane and said second organopolysiloxane.

12. The process of claim 11 in which the quaternary phosphonium compound is tetra-n-butyl phosphonium hydroxide.

13. The process of claim 11 in which the quaternary phosphonium compound is tetraethyl phosphonium hydroxide.

14. A composition of matter comprising a mixture of an organopolysiloxane having the average formula

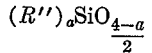

where R'' represents members selected from the class consisting of alkyl, alkenyl, aryl, alkaryl, aralkyl and haloaryl radicals, and $a$ has a value between 1.2 and 2.5, and a quaternary phosphonium compound selected from the class consisting of quaternary phosphonium hydroxides and quaternary phosphonium alkoxides.

15. A polymerizable organopolysiloxane solution comprising (1) a low molecular weight organopolysiloxane represented by the average structural formula

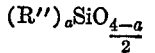

where R'' represents members selected from the class consisting of alkyl, alkenyl, aryl, alkaryl, aralkyl, and haloaryl radicals, and $a$ has a value between 1.2 and 2.5, and (2) from 0.001% to 0.5%, by weight, based on the weight of said organopolysiloxane, of a quaternary phosphonium compound selected from the class consisting of quaternary phosphonium hydroxides and quaternary phosphonium alkoxides.

16. A polymerizable organopolysiloxane solution comprising octamethylcyclotetrasiloxane containing from 0.001 to 0.5 percent, by weight, of a quaternary phosphonium compound having the formula $$(R)_4POR'$$

where R represents members selected from the class consisting of alkyl, cycloalkyl, aryl, aralkyl, and alkaryl radicals and mixtures of the aforesaid members, and R' is a member selected from the class consisting of hydrogen and alkyl radicals.

17. The solution of claim 16 in which the quaternary phosphonium compound is tetra-n-butyl phosphonium hydroxide.

18. The solution of claim 16 in which the quaternary phosphonium compound is n-butyl tricyclohexyl phosphonium hydroxide.

19. The solution of claim 16 in which the quaternary phosphonium compound is tetraethyl phosphonium hydroxide.

20. The solution of claim 16 in which the quaternary phosphonium compound is tetramethyl phosphonium hydroxide.

21. The solution of claim 16 in which the quaternary phosphonium compound is tetra-n-butyl phosphonium butoxide.

22. An organopolysiloxane polymerization catalyst comprising the product of reaction of an organopolysiloxane having the average formula

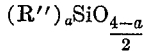

where R'' represents members selected from the class consisting of alkyl, alkenyl, aryl, alkaryl, aralkyl and haloaryl radicals, and $a$ has a value between 1.2 and 2.5, and a quaternary phosphonium compound selected from the class consisting of quaternary phosphonium hydroxides and quaternary phosphonium alkoxides.

23. The catalyst of claim 22 in which the quaternary phosphonium compound is tetra-n-butyl phosphonium hydroxide.

24. The catalyst of claim 22 in which the quaternary phosphonium compound is tetraethyl phosphonium hydroxide.

References Cited in the file of this patent

UNITED STATES PATENTS

| | | |
|---|---|---|
| 2,102,103 | Urbain | Dec. 14, 1937 |
| 2,234,548 | Brannon | Mar. 11, 1941 |
| 2,443,353 | Hyde | June 15, 1948 |
| 2,518,160 | Mathes | Aug. 8, 1950 |

FOREIGN PATENTS

| | | |
|---|---|---|
| 583,875 | Great Britain | Jan. 1, 1947 |

OTHER REFERENCES

Jervis et al.: Chemical Age, vol. 57, page 187, August 9, 1947.